United States Patent
Charron

(10) Patent No.: US 7,445,661 B2
(45) Date of Patent: *Nov. 4, 2008

(54) FUMES TREATING PROCESS

(75) Inventor: Yves Charron, Longpont sur Orge (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 697 days.

This patent is subject to a terminal disclaimer.

(21) Appl. No.: 10/862,433

(22) Filed: Jun. 8, 2004

(65) Prior Publication Data

US 2004/0250998 A1 Dec. 16, 2004

(51) Int. Cl.
*B01D 53/00* (2006.01)
(52) U.S. Cl. ............... 95/39; 60/772; 60/781; 60/39.12; 60/39.5
(58) Field of Classification Search ............. 95/39; 423/437.1; 60/39.12, 39.5, 772, 781
See application file for complete search history.

(56) References Cited

U.S. PATENT DOCUMENTS 6,655,150 B1 * 12/2003 Asen et al. ............. 60/772
6,877,322 B2 * 4/2005 Fan ........................ 60/781

FOREIGN PATENT DOCUMENTS

| EP | 0 551 876 A2 | 7/1993 |
| WO | WO00/48709 | 8/2000 |
| WO | WO00/57990 | 10/2000 |

* cited by examiner

*Primary Examiner*—Robert A. Hopkins
(74) *Attorney, Agent, or Firm*—Antonelli, Terry, Stout & Kraus, LLP.

(57) ABSTRACT

The fumes from gas turbine TG are cooled by heat exchangers E1, E2, E01, E02 and E03 and compressed by compressors C1 and C2. The cold and high-pressure fumes are depleted in carbon dioxide in treating plant 10. The carbon dioxide can be injected into an underground reservoir. The fumes depleted in carbon dioxide are heated by heat exchangers E1 and E2, and expanded by turbines T2, then T1. In particular, after expansion in turbine T2 and before expansion in turbine T1, the fumes are heated using the heat of the fumes from compressor C2.

8 Claims, 2 Drawing Sheets

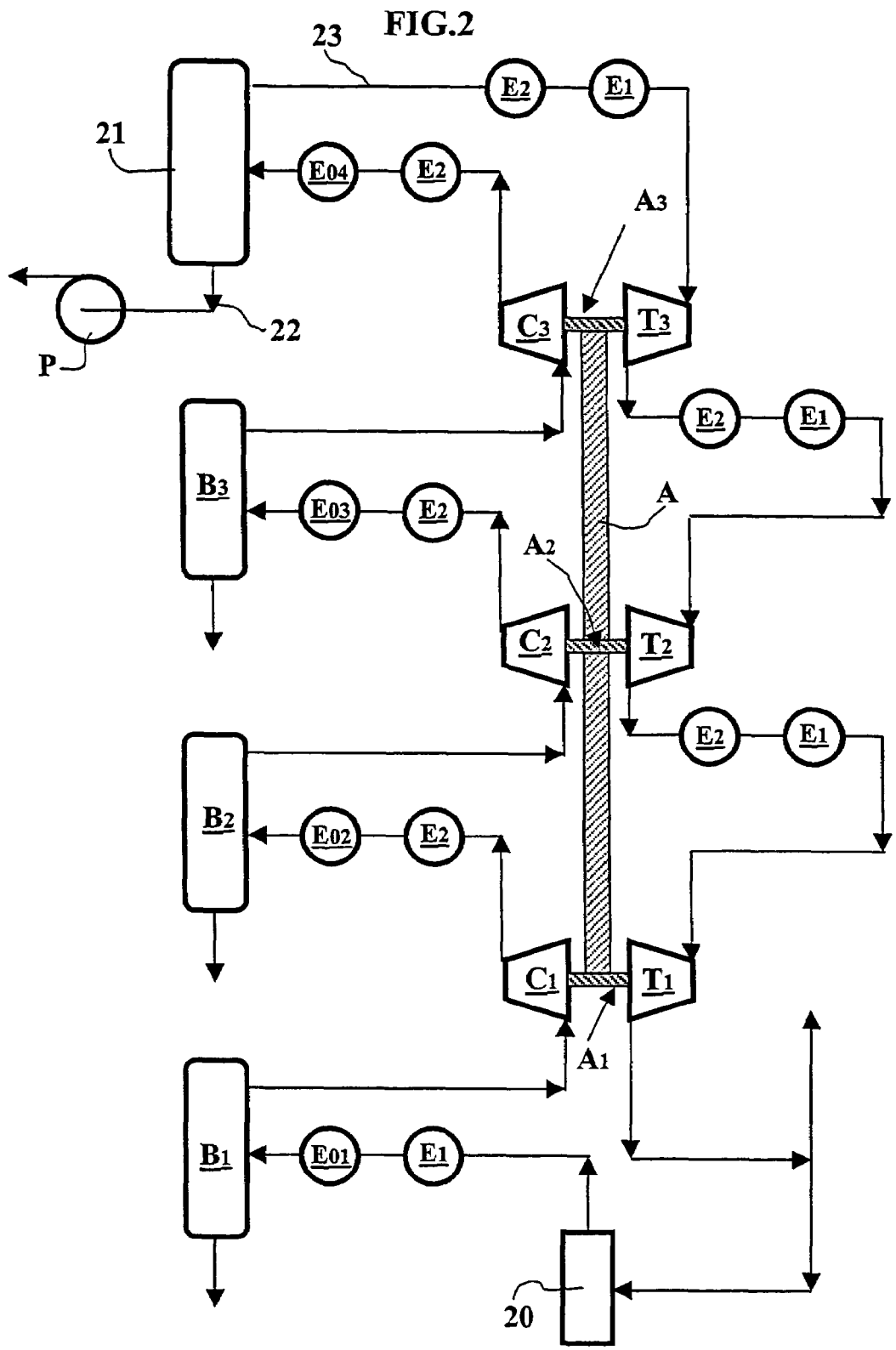

FUMES TREATING PROCESS

FIELD OF THE INVENTION

The present invention relates to a fumes treating process intended to recover the available energy and to collect under high pressure the $CO_2$ present in the fumes. The method applies in particular to the fumes discharged by gas turbines and boilers.

The fumes or exhaust gases at the outlet of gas turbines are discharged to the atmosphere at a relatively high temperature of about 500° C. At this temperature level, the energy released in the atmosphere is comparable to the mechanical energy supplied by the shaft of the turbine. It is economically advantageous to recover this energy.

The fumes are rich in carbon dioxide ($CO_2$). Now, current ecological considerations lead to provide for measures intended to reduce $CO_2$ emissions. For example, some countries impose a tax on $CO_2$ emissions. It is therefore increasingly advantageous, at an economic and ecological level, to separate the $CO_2$ contained in the fumes so as to store or to process it.

BACKGROUND OF THE INVENTION

Document WO-00/48,709 provides a method for separating and collecting the $CO_2$ present in the fumes. The method consists in cooling the fumes from a gas turbine, in compressing the cooled fumes, in separating the $CO_2$ from the cooled compressed fumes and in heating, then in expanding the fumes depleted in $CO_2$.

The method disclosed by document WO-00/48,709 allows to reduce the energy consumption required to separate and collect the $CO_2$ contained in the fumes. However, this method does not aim to recover all of the energy available in the fumes at the gas turbine outlet.

The present invention aims to improve the method disclosed in document WO-00/48,709 and notably to improve recovery of the energy available in the fumes.

SUMMARY OF THE INVENTION

In general terms, the invention provides a method of processing high-temperature and low-pressure fumes in order to recover the available energy and to collect under high pressure the carbon dioxide, wherein the following stages are carried out:

a) compressing the high-temperature and low-pressure fumes so as to obtain high-pressure fumes, b) separating part of the carbon dioxide contained in the high-pressure fumes so as to obtain fumes depleted in carbon dioxide and high-pressure carbon dioxide, c) expanding the fumes depleted in carbon dioxide so as to obtain expanded fumes, d) heating the expanded fumes so as to obtain heated fumes, e) expanding the heated fumes, while recovering expansion energy.

In stage d), the expanded fumes can be heated by heat exchange with the high-pressure fumes.

Before stage c), the fumes depleted in carbon dioxide can be heated by heat exchange with the high-temperature and low-pressure fumes.

The energy supplied during the expansions carried out in stages c) and e) can be used for compression in stage a).

The expansion ratio in stage c) can be lower than the expansion ratio in stage e).

In stage a), the following stages can be carried out: i) compressing said high-temperature and low-pressure fumes so as to obtain medium-pressure fumes, ii) compressing said medium-pressure fumes so as to obtain said high-pressure fumes, and iii) cooling said high-temperature and low-pressure fumes and said medium-pressure fumes. The compression ratio in stage i) can be lower than the compression ratio in stage ii).

According to the invention, the high-pressure carbon-dioxide can be compressed and the high-pressure carbon dioxide can be injected into an underground reservoir.

BRIEF DESCRIPTION OF THE FIGURES

Other features and advantages of the invention will be clear from reading the description hereafter, with reference to the accompanying drawings wherein:

FIG. 2 diagrammatically shows a variant of the method according to the invention.

DETAILED DESCRIPTION

Figure 1:
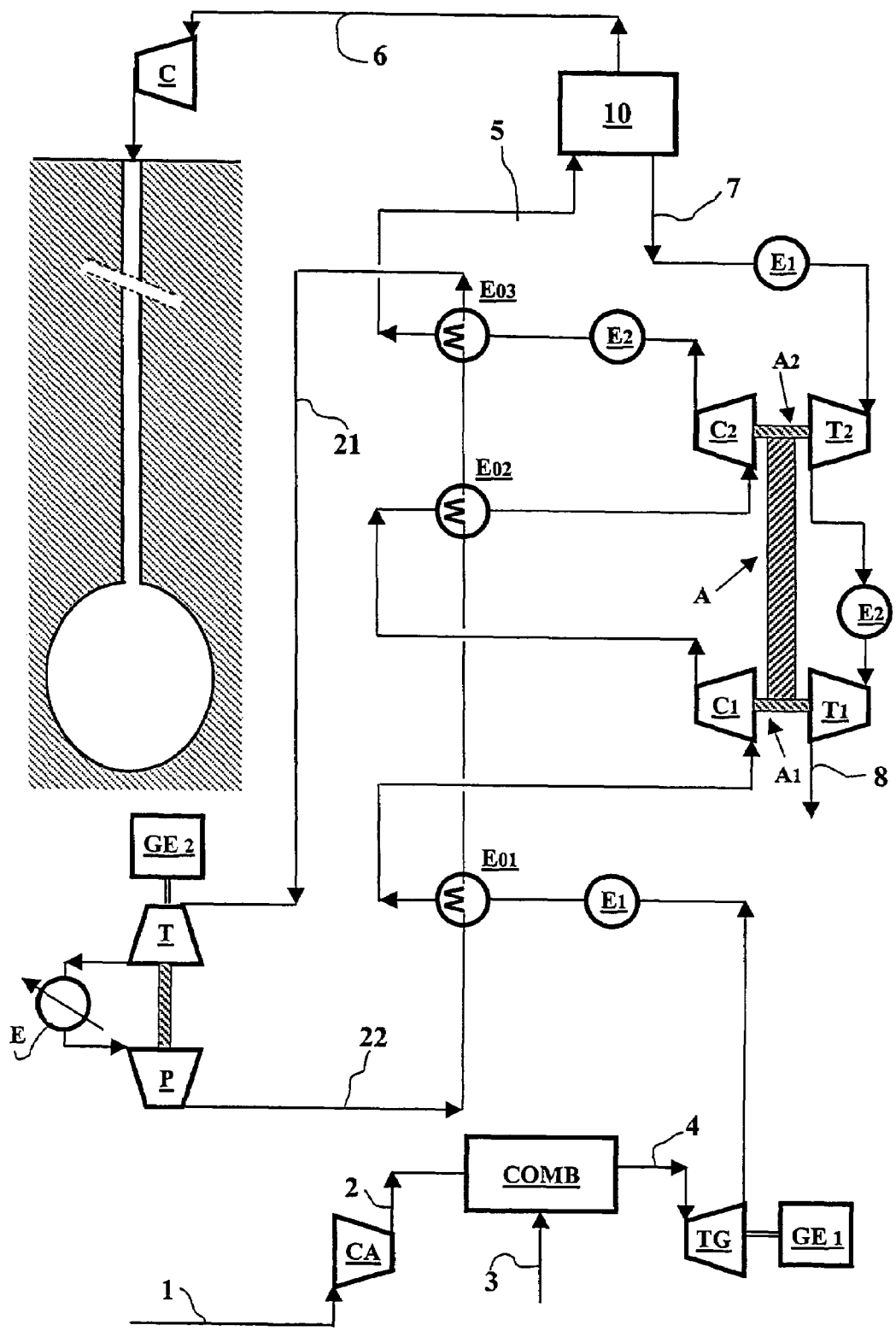
FIG. 1 diagrammatically shows the method according to the invention.

In reference to FIG. 1, the air circulating in line 1 is fed into compressor CA. The air is discharged from the compressor through line 2 under a higher pressure and temperature than the air of line 1. The air and a carbon-containing fuel are respectively fed through lines 2 and 3 into combustion chamber COMB in order to carry out a combustion and to produce combustion gases. The high-pressure and high-temperature combustion gases are fed by means of line 4 into gas turbine TG. Expansion of the gases in turbine TG allows to produce mechanical energy that can be converted into electric energy by electric generator GE1. The combustion gases, also referred to as exhaust gases or fumes, at the outlet of turbine TG are at high temperature, about 500° C., and low pressure, approximately the atmospheric pressure.

The present invention aims to separate and to collect the $CO_2$ contained in these combustion gases at the highest possible pressure while best recovering the energy contained in form of heat in the combustion gases at the outlet of turbine TG.

The combustion gases at the outlet of gas turbine TG are successively cooled in heat exchangers E1, then E01, compressed by compressor C1, cooled in heat exchanger E02, compressed by compressor C2, then cooled in heat exchangers E2 and E03, in order to obtain high-pressure and low-temperature combustion gases.

The high-pressure and low-temperature combustion gases from exchanger E03 are fed through line 5 into treating means 10 suited to separate the $CO_2$ contained in the combustion gases. The $CO_2$ separated from the combustion gases is discharged from treating means 10 through line 6, for example to a storage zone. The storage zone can be an underground reservoir, for example a geologic formation corresponding to a depleted oil reservoir and accessible through a well. The combustion gases depleted in $CO_2$ are discharged through line 7.

Treating means 10 can use well-known $CO_2$ separation methods such as a method using an amine solvent. A method using an amine solvent preferably works in a temperature range between 0° C. and 100° C. The proportion of $CO_2$ in the exhaust gas being low (of the order of 1% to 5%), it is advantageous to increase the pressure of the exhaust gas so as to increase the partial pressure of the $CO_2$ contained in the gas in order to favour absorption of the $CO_2$ by the solvent.

The gases depleted in $CO_2$ coming from the treating means through line 7 are successively heated in heat exchanger E1, expanded by turbine T2, heated in heat exchanger E2, expanded by turbine T1, then discharged to the atmosphere by means of line 8.

In heat exchanger E1, the combustion gases from turbine TG exchange heat with the gases depleted in $CO_2$ from treating means 10.

In heat exchanger E2, the combustion gases from compressor C2 exchange heat with the gases depleted in $CO_2$ from turbine T2.

The method according to the invention has the advantage of carrying out a compression that is as close as possible to a low-temperature isothermal compression by means of several compression stages (with compressors C1 and C2) and by carrying out cooling (in exchangers E1, E01 and E02) of the gas before each compression stage. The larger the number of compression stages preceded by cooling, the closer the compression to a low-temperature isothermal compression. Thus, compression of the gases in compressors C1 and C2 is carried out at low temperature, which improves the compression efficiency.

The method according to the invention affords the advantage of carrying out an expansion that is as close as possible to a high-temperature isothermal expansion by means of several expansion stages (with turbines T1 and T2) and by carrying out, heating (in exchangers E1 and E2) of the gas before each expansion stage. The larger the number of expansion stages preceded by heating, the closer the expansion to a high-temperature isothermal expansion. Thus, expansion of the gases in turbines T1 and T2 is carried out at high temperature, which improves the expansion efficiency.

For compression to be carried out at the lowest possible temperature, and thus to benefit from the highest efficiency during compression in compressors C1 and C2, the gases are cooled in exchangers E01 and E02 by an external source of cold. The source of cold can consist of air or water. The source of cold of exchangers E01 and E02 can also consist of a secondary cooling circuit described below.

Machines C1, C2, T1 and T2 can cooperate so that the mechanical energy obtained during expansion of the gases in turbines T1 and T2 is used for compression of the gases in compressors C1 and C2. For example, turbine T1 is coupled to compressor C1 by means of shaft A1 common to T1 and C1. Similarly, turbine T2 is coupled to compressor C2 by means of shaft A2. When compressors C1 and C2 are respectively coupled to turbines T1 and T2, the compression ratio (outlet pressure/inlet pressure) of C1 is preferably lower than that of C2 and the expansion ratio (outlet pressure/inlet pressure) of T2 is preferably lower than that of T1. Thus, turbine T2, which supplies more energy than turbine T1, is directly coupled to compressor C2, which requires more energy than compressor C1.

Machines C1, C2, T1 and T2 can cooperate so as to form a single machine. Shafts A1 and A2 can be mounted as spider gears on main shaft A. Shafts A1 and A2 can cooperate with the main shaft by means of gear wheels. Thus, the method according to the invention is advantageously implemented by a single machine. Furthermore, the single machine as described above allows to automatically balance the total compression power required by compressors C1 and C2 and the total expansion power supplied by turbines T1 and T2. Power balancing is carried out independently of the power unbalances at the level of each compressor C1 and C2 and of turbines T1 and T2 (for example, the compression ratio of C1 can be lower than that of C2, whereas the expansion ratio of T2 is greater than that of T1). The presence of shaft A geared by shafts A1 and A2 ensures operation of compressors C1 and C2 without an external energy supply.

The $CO_2$ discharged from treating means 10 is substantially at the same pressure as the combustion gases at the outlet of compressor C2. It is advantageous to compress this $CO_2$ in order to decrease the volume thereof and thus to handle the $CO_2$ more easily and efficiently as it is transported to the storage site. Compressor C allows to compress the $CO_2$ from treating means 10 up to pressures than can be higher than 5 MPa or 10 MPa. Compressor C, suited to compress the $CO_2$ in gaseous form, can be a pump if the $CO_2$ from treating means 10 is in liquid form.

The three numerical examples given hereafter illustrate the operating mode of the method described in connection with FIG. 1 and show the significance of the present invention.

In the three examples, the following conditions are applied:

the combustion gases are discharged from gas turbine TG at approximately 550° C. and at atmospheric pressure, the combustion gases are cooled to 40° C. by exchangers E01 and E02 before entering compressors C1 and C2, the combustion gases depleted in $CO_2$ are heated to 540° C. in exchanger E1 by heat exchange with the combustion gases discharged from gas turbine TG, the total power supplied by turbines T1 and T2 is entirely transferred to compressors C1 and C2.

EXAMPLE 1

The values of Table 1 illustrate the operating mode of the method described in connection with FIG. 1 under conditions outside the scope of the invention: there is no heat transfer in exchanger E2 between the exhaust gases at the outlet of compressor C2 and gases depleted in $CO_2$ at the outlet of turbine T2. The compression ratios (outlet pressure/inlet pressure) of compressors C1 and C2 are identical, the expansion ratios (outlet pressure/inlet pressure) in turbines T1 and T2 are identical.

TABLE 1

|  | Compressor C1 | Compressor C2 | Turbine T2 | Turbine T1 |
| --- | --- | --- | --- | --- |
| Inlet temperature (° C.) | 40 | 40 | 550 | 292 |
| Outlet temperature (° C.) | 241 | 241 | 292 | 115 |
| Compression or expansion ratio (outlet pressure/ inlet pressure) | 5 | 5 | 0.2 | 0.2 |

The cumulative compression ratio of C1 and C2 is 25.

EXAMPLE 2

The values of Table 2 illustrate the operating mode of the method described in connection with FIG. 1 under the conditions according to the invention. The compression ratios of each compressor C1 and C2 are identical. The expansion ratio of turbine T1 is higher than that of turbine T2 in order to cool down to a low temperature 15 the gases at the outlet of turbine T2 and to allow heat exchange in exchanger E2 between the exhaust gases at the outlet of compressor C2 and gases depleted in $CO_2$ at the outlet of turbine T2.

TABLE 2

|  | Compressor C1 | Compressor C2 | Turbine T2 | Turbine T1 |
|---|---|---|---|---|
| Inlet temperature (° C.) | 40 | 40 | 550 | 253 |
| Outlet temperature (° C.) | 254 | 254 | 164 | 178 |
| Compression or expansion ratio (outlet pressure/inlet pressure) | 5.42 | 5.42 | 0.06675 | 0.51 |

The cumulative compression ratio of C1 and C2 is 29.4.

The expansion ratio unbalance between turbine T1 and T2 and the heat transfer in exchanger E2 have allowed to improve the cumulative compression ratio of C1 and C2 from 25 under the conditions of example 1 to 29.4 under the conditions of example 2, without any additional energy supply.

EXAMPLE 3

The values of Table 3 illustrate the operating mode of the method described in connection with FIG. 1 under conditions according to the invention. The expansion ratio of turbine T1 is higher than that of turbine T2 so as to cool to a low temperature the gases at the outlet of turbine T2 and to allow heat exchange in exchanger E2 between the exhaust gases at the outlet of compressor C2 and gases depleted in $CO_2$ at the outlet of turbine T2. The compression ratio of compressor C1 is lower than that of compressor C2 in order to heat to a high temperature the exhaust gases at the outlet of compressor C2 and to increase the amount of heat exchanged in exchanger E2.

TABLE 3

|  | Compressor C1 | Compressor C2 | Turbine T2 | Turbine T1 |
|---|---|---|---|---|
| Inlet temperature (° C.) | 40 | 40 | 550 | 330 |
| Outlet temperature (° C.) | 207 | 330 | 196 | 193 |
| Compression or expansion ratio (outlet pressure/inlet pressure) | 4 | 8.4 | 0.09 | 0.33 |

The cumulative compression ratio of C1 and C2 is 33.6.

The compression ratio unbalance between compressor C1 and C2 and the heat transfer in exchanger E2 have allowed to improve the cumulative compression ratio of C1 and C2 from 29.4 under the conditions of example 2 to 33.6 under the conditions of example 3, without any additional energy supply.

The secondary cooling circuit works with a cooling fluid in closed circuit. The cooling fluid can be a hydrocarbon such as propane, isobutane or isopentane, or another cooling fluid allowing change from the liquid phase to the gas phase and from the gas phase to the liquid phase under the conditions of use of the secondary circuit. The secondary circuit can be based on the method of operation of a Rankine thermodynamic cycle. Unlike a conventional cooling cycle, the evaporation stage is operated at a higher pressure than the condensation stage.

The cooling fluid is evaporated in exchangers E01, E02 and E03 in order to cool the combustion gases emitted by gas turbine TG, as well as the exhaust gases from compressors C1 and C2. Furthermore, the cooling fluid can be heated and vaporized by indirect heat exchange with the gases from turbine T1. The evaporated cooling fluid at the outlet of exchanger E03 is fed into expansion means T, a turbine for example. In the expansion means, the fluid is expanded to a low pressure ranging for example between 0.1 MPa and 2 MPa. The fluid expanded to low pressure is cooled and condensed in heat exchanger E so as to obtain a liquefied fluid. Exchanger E can use an ambient fluid such as air or water as the cold source. The liquefied fluid is compressed by pump P from the low pressure to a high pressure that can range between 0.5 MPa and 10 MPa. The high-pressure liquid fluid is vaporized in exchangers E01, E02 and E03, and possibly by indirect heat exchange with the gases from turbine T1.

The energy absorbed by the fluid in form of heat at the level of exchangers E01, E02 and E03 is recovered in form of mechanical energy at the shaft of turbine T. This mechanical energy can be converted to electric energy by electric generator GE2. The shaft of turbine T can be coupled to the shaft of pump P in order to supply the energy required for pumping the liquefied fluid. Advantageously, compressor C compressing the $CO_2$ separated in means 10 is driven by means of the mechanical energy available at the shaft of turbine T of the secondary cooling circuit. For example, the shaft of compressor C is coupled to the shaft of turbine T of the secondary circuit.

The three numerical examples given hereafter illustrate the operating mode of the secondary circuit described in connection with FIG. 1 and show the significance of the present invention. Hydrocarbons were selected to estimate the efficiency of the engine cycle.

The cycle efficiency calculations were carried out by means of Mollier diagrams. The temperature of the heat sources in exchangers E01, E02 and E03 is, by way of example, 200° C., the temperature of the cold source in condenser E is 40° C.

EXAMPLE 4

The cooling fluid is propane. The pressure of the propane in condenser E is set at 1.4 MPa a. Table 4 shows the theoretical efficiency of the engine cycle as a function of the pressure in evaporators E01, E02 and E03.

TABLE 4

| Evaporator pressure MPa a | 4 | 10 | 20 | 38 |
|---|---|---|---|---|
| Theoretical efficiency % | 13 | 20 | 23 | 25 |

Considering the efficiency of turbine T, the real efficiency is approximately 20%.

EXAMPLE 5

The cooling fluid is isobutane. The pressure of the isobutane in condenser E is set at 0.52 MPa a. Table 5 shows the theoretical efficiency of the engine cycle as a function of the pressure in evaporators E01, E02 and E03.

TABLE 5

| Evaporator pressure MPa a | 1 | 2 | 10 | 20 |
|---|---|---|---|---|
| Theoretical efficiency % | 7 | 12 | 22 | 23 |

Considering the efficiency of turbine T, the real efficiency is approximately 20%.

EXAMPLE 6

The cooling fluid is isopentane. The pressure of the isopentane in condenser E is set at 0.14 MPa a. Table 6 shows the theoretical efficiency of the engine cycle as a function of the pressure in evaporators E01, E02 and E03.

TABLE 6

| Evaporator pressure MPa a | 2.2 | 3.4 | 5 | 10 |
|---|---|---|---|---|
| Theoretical efficiency % | 18 | 21.5 | 22.5 | 21 |

Considering the efficiency of turbine T, the real efficiency is approximately 18%.

The invention is not limited to the embodiment of FIG. 1. It is possible to vary the number of compressors and turbines acting on the exhaust gases. It is also possible to modify the number and the position of the heat exchangers. FIG. 2 shows a second embodiment of the invention.

In reference to FIG. 2, the fumes from plant 20 (for example a gas turbine or a boiler producing fumes at a temperature ranging for example between 400° C. and 600° C. and substantially at atmospheric pressure) notably comprise nitrogen, oxygen, carbon dioxide and water.

The fumes are cooled in heat exchanger E1, then in heat exchanger E01 to a low temperature ranging between 0° C. and 100° C. The low-temperature fumes are fed into separating drum B1. The water condensed during cooling in heat exchangers E1 and E01 is discharged at the bottom of drum B1.

The fumes discharged at the top of drum B1 are compressed in compressor C1. The fumes under pressure from compressor C1 are cooled in heat exchanger E2, then in heat exchanger E02 to a low temperature ranging between 0° C. and 100° C. The low-temperature fumes are fed into separating drum B2. The water condensed during cooling in heat exchangers E2 and E02 is discharged at the bottom of drum B2. The fumes discharged at the top of drum B2 are compressed in compressor C2. The fumes under pressure from compressor C2 are cooled in heat exchanger E2, then in heat exchanger E03 to a low temperature ranging between 0° C. and 100° C. The low-temperature fumes are fed into separating drum. B3. The water condensed during cooling in heat exchangers E2 and E03 is discharged at the bottom of drum B3. The fumes discharged at the top of drum B3 are compressed in compressor C3. The fumes under pressure from compressor C3 are cooled in heat exchanger E2, then in heat exchanger E04 to a low temperature ranging between 0° C. and 100° C.

The low-temperature fumes are fed into means 21 intended for high-pressure collection of $CO_2$. The $CO_2$ separated from the fumes is discharged through line 22, compressed by pump P and sent to a storage site. The fumes discharged through line 23 are depleted in $CO_2$.

The $CO_2$-depleted fumes circulating in line 23 are heated in heat exchanger E2, then in heat exchanger E1. The high-temperature fumes are expanded in turbine T3. During expansion in turbine T3, the temperature of the fumes decreases. The fumes are heated in heat exchanger E2, then in heat exchanger E1. The high-temperature fumes are expanded in turbine T2. During expansion in turbine T2, the temperature of the fumes decreases. The fumes are heated in heat exchanger E2, then in heat exchanger E1. Then, the high-temperature fumes are expanded in turbine T1.

The fumes from turbine T1 are discharged to the atmosphere or recycled to the inlet of the turbine of plant 20.

The fumes are cooled in exchangers E01, E02, E03 and E04 by an external source of cold. The source of cold can consist of air or water. The source of cold of exchangers E01, E02, E03 and E04 can also consist of a secondary cooling circuit as described in connection with FIG. 1 (see references E01, E02, E03, 21, 22, T, P and E of FIG. 1).

Exchanger E1 allows to exchange heat between the fumes coming directly from plant 20 and the fumes depleted in $CO_2$ before they enter turbines T1, T2 and T3.

Exchanger E2 allows to exchange heat between the fumes coming directly from compressors C1, C2 and C3 and the fumes depleted in $CO_2$ before they enter turbines T1, T2 and T3.

Compressors C1, C2 and C3 are coupled to turbines T1, T2 and T3. Thus, the mechanical energy obtained upon expansion of the $CO_2$-depleted fumes allows to drive compressors C1, C2 and C3.

Machines C1 and T1, respectively C2 and T2, C3 and T3, can be coupled by shaft Al, respectively A2, A3. Shafts A1, A2 and A3 can be coupled to a single main shaft A by means of gears.

Thus, compressors C1, C2 and C3, and turbines T1, T2 and T3 form a single machine. The mechanical energy obtained upon expansion in turbines T1, T2 and T3 is transferred to compressors C1, C2 and C3 independently of the compression or expansion ratio unbalances of machines C1, C2 and C3, and T1, T2 and T3.

The invention claimed is:

1. A method of processing high-temperature and low-pressure fumes in order to recover the available energy and to collect at high pressure the carbon dioxide, wherein the following stages are carried out:
   a) compressing said high-temperature and low-pressure fumes so as to obtain high-pressure fumes,
   b) separating part of the carbon dioxide contained in said high-pressure fumes so as to obtain fumes depleted in carbon dioxide and high-pressure carbon dioxide,
   c) expanding said fumes depleted in carbon dioxide so as to obtain expanded fumes,
   d) heating said expanded fumes so as to obtain heated fumes,
   e) expanding said heated fumes, while recovering expansion energy.

2. A method as claimed in claim 1 wherein, in stage d), said expanded fumes are heated by heat exchange with said high-pressure fumes.

3. A method as claimed in claim 1, before stage c), said fumes depleted in carbon dioxide are heated by heat exchange with said high-temperature and low-pressure fumes.

4. A method as claimed in claim 1, wherein the energy supplied during the expansions carried out in stages c) and e) is used for compression in stage a).

5. A method as claimed in claim 1, wherein the expansion ratio in stage c) is lower than the expansion ratio in stage e).

6. A method as claimed in claim 1 wherein, in stage a), the following stages are carried out: i)-compressing said high-temperature and low-pressure fumes so as to obtain medium-pressure fumes, ii) compressing said medium-pressure fumes so as to obtain said high-pressure fumes, and iii) cooling said high-temperature and low-pressure fumes and said medium-pressure fumes.

7. A method as claimed in claim 6, wherein the compression ratio in stage i) is lower than the compression ratio in stage ii).

8. A method as claimed in claim 1, wherein said high-pressure carbon dioxide is compressed and said high-pressure carbon dioxide is injected into an underground reservoir.

* * * * *